United States Patent
Baudier et al.

(10) Patent No.: US 11,976,198 B2
(45) Date of Patent: May 7, 2024

(54) MIXTURES OF BITUMEN AND POLYMER COMPOSITIONS

(71) Applicant: BASELL POLIOLEFINE ITALIA S.R.L., Milan (IT)

(72) Inventors: Vincent Baudier, Brussels (BE); Gisella Biondini, Ferrara (IT); Claudio Cavalieri, Ferrara (IT); Monica Galvan, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 147 days.

(21) Appl. No.: 17/420,475

(22) PCT Filed: Jan. 3, 2020

(86) PCT No.: PCT/EP2020/050052
§ 371 (c)(1),
(2) Date: Jul. 2, 2021

(87) PCT Pub. No.: WO2020/144102
PCT Pub. Date: Jul. 16, 2020

(65) Prior Publication Data
US 2022/0056274 A1    Feb. 24, 2022

(30) Foreign Application Priority Data
Jan. 10, 2019 (EP) .................... 19151121

(51) Int. Cl.
*C08L 95/00* (2006.01)

(52) U.S. Cl.
CPC ........... *C08L 95/00* (2013.01); *C08L 2205/03* (2013.01); *C08L 2555/86* (2013.01)

(58) Field of Classification Search
CPC ... C08L 95/00; C08L 2205/03; C08L 2555/86
USPC ........................................................ 524/70
See application file for complete search history.

(56) References Cited

U.S. PATENT DOCUMENTS

| 4,399,054 A | 8/1983 | Ferraris et al. |
| 5,565,510 A * | 10/1996 | Giavarini ................. C08L 95/00 524/68 |
| 2018/0186987 A1* | 7/2018 | Cavalieri .............. C08F 210/16 |

FOREIGN PATENT DOCUMENTS

| CN | 1238795 A | 12/1999 | |
| CN | 101040007 A | 9/2007 | |
| EP | 0045977 A2 | 2/1982 | |
| EP | 0361493 A1 | 4/1990 | |
| EP | 0411627 A2 | 2/1991 | |
| EP | 0496625 A2 | 7/1992 | |
| EP | 0592852 A1 | 4/1994 | |
| EP | 0728769 A1 | 8/1996 | |
| TW | 412573 B | 11/2000 | |
| WO | WO-2008015113 A2 * | 2/2008 | ............ C08F 210/06 |
| WO | 2009068371 A1 | 6/2009 | |
| WO | 2016207235 A1 | 12/2016 | |
| WO | 2016207236 A1 | 12/2016 | |
| WO | 2017202600 A1 | 11/2017 | |

OTHER PUBLICATIONS

International Search Report and Written Opinion dated Feb. 18, 2020 (dated Feb. 18, 2020) for Corresponding PCT/EP2020/050052.

* cited by examiner

*Primary Examiner* — Ling Siu Cho
*Assistant Examiner* — Ronald Grinsted

(57) ABSTRACT

A mixture made from or containing
T1) from 99 wt % to 75 wt % of bitumen, and
T2) from 1 wt % to 25 wt % of a polymer composition made from or containing
A) 5-35% by weight of a propylene homopolymer or a propylene ethylene copolymer;
B) 20-50% by weight of a copolymer of ethylene and a $C_3$-$C_8$ alpha-olefin containing from 1.0% to 20.0% by weight of alpha-olefin units; and
C) 30-60% by weight of a copolymer of ethylene and propylene containing from 25.0% to 75.0% by weight of ethylene derived units.

15 Claims, No Drawings

MIXTURES OF BITUMEN AND POLYMER COMPOSITIONS

This application is the U.S. National Phase of PCT International Application PCT/EP2020/050052, filed Jan. 3, 2020, claiming benefit of priority to European Patent Application No. 19151121.1, filed Jan. 10, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to mixtures made from or containing bitumen and polymer compositions.

BACKGROUND OF THE INVENTION

In some instances, polymer compositions modify bitumen.

In some instances, the modified bitumen mixtures are used in roofing applications.

SUMMARY OF THE INVENTION

In a general embodiment, the present disclosure provides a mixture made from or containing:

T1) from 99 wt % to 75 wt % of bitumen, and
T2) from 1 wt % to 25 wt % of a polymer composition made from or containing A) 5-35% by weight of a propylene homopolymer or a propylene ethylene copolymer, containing 90% by weight or more of propylene units, wherein component A) contains 10.0% by weight or less of a fraction soluble in xylene at 25° C. (XSA), both the amount of propylene units and the fraction XSA being referred to the weight of A);

B) 20-50% by weight of a copolymer of ethylene and a C3-C8 alpha-olefin containing from 1.0% to 20.0% by weight of alpha-olefin units and containing 25.0% by weight or less of a fraction soluble in xylene at 25° C. (XSB), both the amount of alpha-olefin units and the fraction XSB being referred to the weight of (B); and C) 30-60% by weight of a copolymer of ethylene and propylene containing from 25.0% to 75.0% by weight of ethylene derived units and containing from 40.0% to 95.0% by weight of a fraction soluble in xylene at 25° C. (XSC), both the amount of ethylene units and the fraction XSC being referred to the weight of (C);

the amounts of (A), (B) and (C) being referred to the total weight of (A)+(B)+(C), the sum of the amount of (A)+(B)+(C) being 100;

the amounts, wt %, of T1+T2 being 100 wt %.

DETAILED DESCRIPTION OF THE INVENTION

In some embodiments, the present disclosure provides a mixture made from or containing:

T1) from 99 wt % to 75 wt % alternatively from 98 wt % to 80 wt %; alternatively from 97 wt % to 90 wt %, alternatively from 97 wt % to 92 wt %, of bitumen; and T2) from 1 wt % to 25 wt %; alternatively from 2 wt % to 20 wt %; alternatively from 3 wt % to 10 wt %, alternatively from 3 wt % to 8 wt %, of a polymer composition made from or containing A) 5-35% by weight; alternatively 10-30% by weight; alternatively 15-25% by weight, of a propylene homopolymer or a propylene ethylene copolymer, containing 90.0% by weight or more, alternatively 95.0% by weight or more; alternatively 97.0% by weight or more of propylene derived units, wherein component A) contains 10.0% by weight or less, alternatively 8.0 wt % or less more, alternatively 6.0 wt % or less, of a fraction soluble in xylene at 25° C. ($XS_A$), both the amount of propylene units and the fraction $XS_A$ being referred to the weight of A);

B) 20-50% by weight; alternatively 25-45% by weight; alternatively 30-40% by weight, of a copolymer of ethylene and a $C_3$-$C_8$ alpha-olefin containing from 1.0% to 20.0% by weight, alternatively from 5.0% to 15.0% by weight; alternatively from 7.0% to 12.0% by weight, of alpha-olefin derived units and containing 25.0% by weight or less; alternatively from 20.0% by weight or less; alternatively 17.0% by weight or less, of a fraction soluble in xylene at 25° C. ($XS_B$), both the amount of alpha-olefin units and the fraction $XS_B$ being referred to the weight of (B); and C) 30-60% by weight; alternatively 35-55% by weight; alternatively 40-50% by weight, of a copolymer of ethylene and propylene containing from 25.0% to 75.0% by weight; alternatively from 37.0% to 65.0% by weight; alternatively from 45.0% to 58.0% by weight, of ethylene units and containing from 40.0% to 95.0% by weight of a fraction soluble in xylene at 25° C. ($XS_C$), both the amount of ethylene units and the fraction $XS_C$ being referred to the weight of (C);

the amounts of (A), (B) and (C) being referred to the total weight of (A)+(B)+(C), the sum of the amount of (A)+(B)+(C) being 100;

the amounts, wt %, of T1+T2 being 100 wt %.

In some embodiments, component (A) has a melt flow rate (230° C./2.16 kg) between 50 and 200 g/10 min; alternatively between 80 and 170 g/10 min.

In some embodiments, components (A)+(B) blended together have a melt flow rate (230° C./2.16 kg) between 0.1 and 70 g/10 min. alternatively between 1 and 50 g/10 min; alternatively between 8 and 40 g/10 min.

In some embodiments, component B) has a density (determined according to ISO 1183 at 23° C.) of from 0.940 to 0.965 g/cm³. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene 1-hexene and 1-octene. In some embodiments, the alpha-olefin comonomer is 1-butene.

In some embodiments, the component T2) has a melt flow rate (230° C./2.16 kg) between 0.5 to 25 g/10 min, alternatively from 0.8 to 20.0 g/10 min; alternatively from 1.0 to 18.0 g/10 min.

In some embodiments, the component T2) has an intrinsic viscosity [η] (measured in tetrahydronaphthalene at 135° C.) of the xylene soluble fraction at 25° C. between 1.5 to 4.0 dl/g, alternatively between 2.0 and 3.5 dl/g; alternatively between 2.1 and 2.8 dl/g.

As used herein, the term "copolymer" refers to polymers containing two kinds of comonomers such as propylene and ethylene or ethylene and 1-butene.

In some embodiments, the bitumen (T1) includes solid, semi-solid or viscous distillation residues of the petroleum refinery process, consisting predominantly of high molecular weight hydrocarbons. In some embodiments, the structure of the bitumen is partially altered. In some embodiments, the structure is altered by oxidation.

In some embodiments, component T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is a continuous process. In some embodiments, the polymerization is a batch process. In some embodiments, the polymerization is carried out in liquid phase, in the presence or not of inert diluent, or in gas phase, or by mixed liquid-gas techniques. In some embodiments, the polymerization is carried out in gas phase.

In some embodiments, the temperature for the polymerization steps is from 50 to 100° C. In some embodiments, the pressure for the polymerization steps is atmospheric or higher.

In some embodiments, the molecular weight is regulated. In some embodiments, the molecular weight regulator is hydrogen.

In some embodiments, the polymerizations are carried out in the presence of a Ziegler-Nana catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting compounds of Ti, V, Zr, Cr and Hf. In some embodiments, the transition metal compound is supported on $MgCl_2$.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, the succinic acid esters are represented by the formula (I):

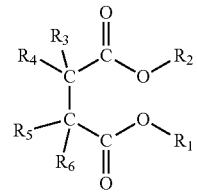

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, $R_3$ and $R_5$ are different from hydrogen and linked to different carbon atoms. In some embodiments, $R_4$ and $R_6$ are different from hydrogen and linked to different carbon atoms.

In some embodiments, the electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates.

In some embodiments, the heterocyclic compounds are selected from the group consisting of 2,2,6,6-tetramethylpiperidine and 2,6-diisopropylpiperidine.

In some embodiments, the silicon compounds have the formula $R^1{}_aR^2{}_bSi(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of $(tert\text{-}butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$.

In some embodiments, the 1,3-diethers are used as external donors. In some embodiments, the internal donor is a 1,3-diether and the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the polyolefin compositions T2) are prepared as a physical blend of the separately-prepared components rather than as a reactor blend.

In some embodiments, the mixture contains at least one other type of polymer, hereinafter identified as component (T3), in addition to the polymer composition (T2).

In some embodiments, the mixture is made from or containing, as component (T3), one or more olefinic or nonolefinic polymers. In some embodiments, polymers (T3) are selected from the group consisting of amorphous or atactic polymers, styrene-butadiene-styrene (SBS) copolymers, ethylene polyvinyl acetate, low density polyethylene, high density polyethylene, and other polyolefins. In some embodiments, the amorphous polyolefin is amorphous polypropylene. In some embodiments, polymers (T3) are selected from the group consisting of isotactic polypropylene and ethylene-propylene random copolymers.

In some embodiments, the additional polymers (T3) are added in quantities greater than or equal to 0.5%, alternatively from 0.5 to 30%, alternatively from 0.5 to 23%, by weight with respect to the weight of the mixture. In some embodiments, the total quantity of component T2 and T3 (that is, the amount of T2+T3) in the bituminous mixture is less than or equal to 40%, alternatively 25%, by weight with respect to the total weight of the mixture.

In some embodiments and for incorporating the polymer composition (T2) and the other components into the bitumen, the mixing process is carried out at a temperature from 120 to 250° C.; alternatively from 130° C. to 180° C.

In some embodiments, the mixtures of the present disclosure are used for polymer-modified bitumen applications, alternatively for road paving, alternatively for roofing membranes.

The following examples are given to illustrate, but not limit the present disclosure.

EXAMPLES

Characterizations

Xylene-Soluble Faction at 25° C. (XS or Xs)

The Xylene Soluble fraction was measured according to ISO 16152, 2005, but with the following deviations (the parentheses provides that which was prescribed by the ISO 16152)

The solution volume was 250 ml (200 ml).

During the precipitation stage at 25° C. for 30 min, the solution, for the final 10 minutes, was kept under agitation by a magnetic stirrer (30 min, without any stirring at all).

The final drying step was under vacuum at 70° C. (100° C.);

The content of the xylene-soluble fraction was expressed as a percentage of the original 2.5 grams and then, by difference (complementary to 100), the xylene insoluble %;

XS of components B) and C) were calculated by using the formula;

$$XS_{tot} = W_A XS_A + W_B XS_B + W_C XS_C$$

wherein $W_A$, $W_B$ and $W_C$ were the relative amount of components A, B and C (A+B+C=1)

Melt Flow Rate

Measured according to ISO 1133 at 230° C. with a load of 2.16 kg, unless otherwise specified.

Intrinsic Viscosity IV

The sample was dissolved in tetrahydronaphthalene at 135° C. and then poured into a capillary viscometer. The viscometer tube (Ubbelohde type) was surrounded by a cylindrical glass jacket; this setup allowed temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer (C2 and C4) Content Determined by Using $^{13}$C NMR $^{13}$C NMR spectra of base polymers and the composition fractions were acquired on a Bruker AV600 spectrometer equipped with cryo probe, operating 150.91 MHz in the Fourier transform mode at 120° C. The peak of the S66 carbon (nomenclature according C. J. Carman, R. A. Harrington and C. E. Wilkes, Macromolecules, 10, 3, 536 (1977)) was used as an internal reference at 29.7 ppm. About 30 mg of sample were dissolved in 0.5 ml of 1,1,2,2 tetrachloro ethane d2 at 120° C. Each spectrum was acquired with a 90° pulse, 15 seconds of delay between pulses and CPD to remove 1H-13C coupling. 512 transients were stored in 65 K data points using a spectral window of 9000 Hz. The assignments of the spectra were made according to M. Kakugo, Y. Naito, K. Mizunuma and T. Miyatake, Macromolecules 15(4), 1150 (1982) and E. T Hsieh and J. C. Randall, Macromolecules 15, 353-360 (1982).

The triad distribution was obtained using the following relations:

$$PPP = 100 I_{10}/\Sigma$$

$$PPE = 100 I_6/\Sigma \quad EPE = 100 I_5/\Sigma$$

$$BBB = 100 I_3/\Sigma$$

$$BBE = 100 I_2/\Sigma$$

$$EBE = 100 I_{11}/\Sigma$$

$$XEX = 100 I_{12}/\Sigma$$

$$XEE = 100 (I_1 + I_4)/\Sigma$$

$$EEE = 100 (0.5 I_9 + 0.25(I_7 + I_8))/\Sigma$$

wherein $$\Sigma = I_1 + I_2 + I_3 + I_4 + I_5 + I_6 + 0.25 I_7 + 0.25 I_8 + 0.5 I_9 + I_{10} + I_{11} + I_{12}$$

and wherein X were propylene (P) or 1-butene (B), and $I_1$ to $I_{12}$ were the areas of the corresponding carbon atoms as reported below (selected triads and assignments were reported):

| Number | Chemical Shift (ppm) | Carbon | Sequence |
|---|---|---|---|
| $I_1$ | 37.64-37.35 | $S_{\alpha\delta}$ | PEE |
| $I_2$ | 37.35-37.15 | $T_{\beta\delta}$ | BBE |
| $I_3$ | 35.27-34.92 | $T_{\beta\beta}$ | BBB |
| $I_4$ | 34.39-33.80 | $S_{\alpha\delta}$ | BEE |
| $I_5$ | 33.13 | $T_{\delta\delta}$ | EPE |
| $I_6$ | 30.93-30.77 | $T_{\beta\delta}$ | PPE |
| $I_7$ | 30.39 | $S_{\gamma\delta}$ | BEEE |
| $I_8$ | 30.29 | $S_{\gamma\delta}$ | PEEE |
| $I_9$ | 29.97 | $S_{\delta\delta}$ | EEE |
| $I_{10}$ | 29.14-28.31 | $T_{\beta\beta}$ | PPP |
| $I_{11}$ | 26.70-26.55 | $2B_2$ | EBE |
| $I_{12}$ | 24.88-24.14 | $S_{\beta\beta}$ | XEX |

The molar content of ethylene (E), of propylene (P) and of 1-butene (B) was obtained from triads using the following relations:

$$E\ (m\ \%) = EEE + XEE + XEX$$

$$P\ (m\ \%) = PPP + PPE + EPE$$

$$B\ (m\ \%) = BBB + BBE + EBE$$

Examples 1—Preparation of Polyolefin Composition Component T2

Catalyst Precursor

The solid catalyst component used in polymerization was a Ziegler-Natta catalyst component supported on magnesium chloride, containing titanium and diisobutylphthalate as internal donor. An initial amount of microspheroidal MgCl2.2.8C2H5OH was prepared according to the method described in Example 2 of U.S. Pat. No. 4,399,054 but operating at 3,000 rpm instead of 10,000. The resulting adduct was then subjected to thermal dealcoholation at increasing temperatures from 30 to 130° C. in a nitrogen current until the molar alcohol content per mol of Mg was 1.16. Into a 1000 mL four-necked round flask, purged with nitrogen, 500 mL of TiCl4 were introduced at 0° C. While stirring, 30 grams of the microspheroidal MgCl2.1.16C2H5OH adduct were added. The temperature was raised to 120° C. and maintained for 60 minutes. During the temperature increase, an amount of diisobutylphthalate was added to produce a Mg/diisobutylphthalate molar ratio of 18. After the 60 minutes, the stirring was stopped, the liquid was siphoned off, and the treatment with TiCl4 was repeated at 100° C. for 1 hour in the presence of an amount of diisobutylphthalate to produce a Mg/diisobutylphthalate molar ratio of 27. The stirring was stopped. The liquid was siphoned off, and the treatment with TiCl4 was repeated at 100° C. for 30 min. After sedimentation and siphoning at 85° C., the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was then subjected to prepolymerization by suspending the catalyst system in liquid propylene at 50° C. for about 75 minutes before introducing the catalyst system into the first polymerization reactor.

Polymerization

The polymerization was carried out continuously in a series of three gas-phase reactors equipped with devices to transfer the product from the first reactor to the second reactor. Into the first gas phase polymerization reactor, a propylene-based polymer (i) was produced by feeding, in a continuous and constant flow, the prepolymerized catalyst system, hydrogen (used as molecular weight regulator) and propylene, with the components in a gas state. The propylene-based polymer (i) coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor, a copolymer of ethylene (ii) was produced. The product coming from the second reactor was discharged in a continuous flow and, after having been purged of unreacted monomers, introduced, in a continuous flow, into the third gas phase reactor, together with quantitatively constant flows of hydrogen, ethylene and propylene, with components in a gas state. In the third reactor, an ethylene-propylene polymer (iii) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried. Thereafter, the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.1% by weight of Irganox® 1010;
0.1% by weight of Irgafos® 168;
0.04% by weight of DHT-4A (hydrotalcite);

where the percent amounts refer to the total weight of the polymer and stabilizing additive composition.

The Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate while Irgafos® 168 was tris(2,4-di-tert-butylphenyl)phosphite. The characteristics relating to the polymer composition are reported in Table 2.

TABLE 1

| Polymerization conditions | | |
|---|---|---|
| Example | | 1 |
| 1$^{st}$ Reactor-component (A) | | |
| Temperature | ° C. | 60 |
| Pressure | barg | 16 |
| H$_2$/C$_3$- | mol. | 0.24 |
| Split | wt % | 22 |
| Xylene soluble of (A) (XS$_A$) | wt % | 4.2 |
| MFR of (A) | g/10 min. | 110 |
| 2$^{nd}$ Reactor-component (B) | | |
| Temperature | ° C. | 80 |
| Pressure | barg | 18 |
| H$_2$/C$_2$- | mol. | 0.81 |
| C$_4$-/(C$_2$- + C$_4$-) | mol. | 0.25 |
| C$_2$-/(C$_2$- + C$_3$-) | mol. | 0.98 |

TABLE 1-continued

Polymerization conditions

| Example | | 1 |
|---|---|---|
| Split | wt % | 32 |
| $C_2$-content of B * | wt % | 90 |
| $C_4$-content of B * | wt % | 10 |
| Xylene soluble of B ($XS_B$) * | wt % | 16.0 |
| Xylene soluble of A + B | wt % | 12.0 |
| MFR of (A + B) | g/10 min. | 35.9 |
| 3$^{rd}$ Reactor-component (C) | | |
| Temperature | ° C. | 65 |
| Pressure | barg | 18 |
| $H_2/C_2$- | mol. | 0.17 |
| $C_2$-/($C_2$- + $C_3$-) | mol. | 0.42 |
| Split | wt % | 46 |
| $C_2$-content of C * | wt % | 52 |
| Xylene soluble of (C) ($XS_C$)* | wt % | 83 |

$C_2$- = ethylene;
$C_3$- = propylene;
$C_4$- = 1-butene (IR);
split = amount of polymer produced in the concerned reactor.
* Calculated values.

Comparative Example 2

Comparative example 2 was an heterophasic copolymer having an homopolymer matrix and a propylene ethylene rubber phase. The feature of the polymer of comparative example 2 are reported on Table 2.

TABLE 2

| Example | | 1 | comp 2 |
|---|---|---|---|
| component A | | | |
| C2 content | wt % | 0 | 3 |
| $XS_A$ | wt % | 4.2 | 6.5 |
| MFR | g/10 min | 110 | 23 |
| split | wt % | 22 | 32 |
| component B | | | |
| $XS_B$* | wt % | 16 | 90.5 |
| C2 content* | wt % | 90.0 | 47.3 |
| C4 content* | wt % | 10.0 | 0 |
| split | wt % | 32 | 36 |
| MFR A + B | g/10 min | 35.9 | 1.20 |
| Component C | | | |
| $XS_C$* | wt % | 83 | 52 |
| C2 content* | wt % | 52 | 27.5 |
| split | wt % | 44.6 | 32 |
| total composition | | | |
| MFR | g/10 min | 1.61 | 0.5 |
| IV on soluble in Xylene | dl/g | 2.4 | 3.2 |

*Calculated values

Bitumen from the Polymer of Example 1 and Comparative Example 2

The polymer of example 1 and comparative example 2 were blended with bitumen. The blends contained 5% of the polymers of example 1 (T2) and comparative example 2 (T2) and 95% of bitumen (T1). The two compositions were marked as B1 and B2

Asphalt

5% of B1 and B2 were mixed with sand, stone and gravel to obtain asphalt. A black sample obtained by using bitumen (T1) without T2 and sand, stone and gravel was produced (sample C1).

The features of the asphalt were measured, and the results are reported on Table 3.

TABLE 3

| Asphalt | Modulus (MPa) 30° C./20° C. | CTI (N/mm$^2$) | RTI (N/mm$^2$) |
|---|---|---|---|
| from ex 1 (B1) | 6220/11700 | 182 | 1.28 |
| from comp ex 2 (B2) | 4075/9700 | 160 | 1.23 |
| Asphalt from bitumen without T2 (sample Cl) | 2800/7400 | 114 | 1.06 |

Modulus was measured according to EN 12697-26 (Annex A)—method for characterizing the stiffness by indirect tensile test.

CTI, Coefficient of Indirect Tensile strength, and RT, Indirect Tensile strength, were measured according to EN 12697-23 on a sample having a diameter of 150 mm.

Bitumen from the Polymer of Example 1 and Comparative Example 3

The polymer of example 1 was blended with bitumen. The blends contained 4 wt % and 5 wt % of the polymers of example 1 (T2). T1 is the bitumen without additives. The compositions were marked as B3 and B4, The features of the obtained bitumen are reported on Table 4.

TABLE 4

| | | blank | B3 | B4 |
|---|---|---|---|---|
| T1 | Wt % | 100 | 96 | 95 |
| T2 ex 1 | Wt % | | 4 | 5 |
| R&B | ° C. | 43 | 58 | 80 |
| PEN | (dmm) | 77 | 57 | 48 |

The properties of the polymer composition/bitumen mixtures were determined as follows.

| Property | Method |
|---|---|
| Ring & Ball (R&B): | EN 1427:2015; |
| Penetration (PEN): | EN 1426:2015; |

The R&B test determined the temperature at which a layer of bitumen, in a brass ring, experienced a certain deformation under the weight of a steel ball as the temperature rose.

The penetration test determined the depth, measured in $\frac{1}{10}$ mm, to which a 100 g needle penetrated in 5 seconds into the bitumen at a temperature of 25° C.

What is claimed is:

1. A mixture consisting of:
   T1) from 99 wt % to 75 wt % of bitumen, and
   T2) from 1 wt % to 25 wt % of a polymer composition comprising
   A) 5-35% by weight of a propylene homopolymer or a propylene ethylene copolymer containing 90% by weight or more of propylene units, wherein component A) contains 10.0% by weight or less of a fraction soluble in xylene at 25° C. ($XS_A$), both the amount of propylene units and the fraction $XS_A$ being referred to the weight of A);
   B) 20-50% by weight of a copolymer of ethylene and a $C_3$-$C_8$ alpha-olefin containing from 1.0% to 20.0% by weight of alpha-olefin units and containing 25.0% by weight or less of a fraction soluble in xylene at 25° C. (XSB), both the amount of alpha-olefin units and of the fraction $XS_B$ being referred to the weight of (B), wherein in component T2), components (A)+(B) blended together have a melt flow rate (230° C./2.16 kg) ranging between 0.1 and 70 g/10 min, and wherein (B) has a density of 0.940 to 0.965 g/cm³; and C) 30-60% by weight of a copolymer of ethylene and propylene containing from 25.0% to 75.0% by weight of ethylene units and containing from 40.0% to 95.0% by weight of a fraction soluble in xylene at 25° C. ($XS_C$), both the amount of ethylene units and the fraction $XS_C$ being referred to the weight of (C);

the amounts of (A), (B) and (C) being referred to the total weight of (A)+(B)+(C), the sum of the amount of (A)+(B)+(C) being 100;

the amounts, wt %, of T1+T2 being 100 wt % wherein the mixture is a road paving mixture.

2. The mixture according to claim 1, wherein in component T2), Component A ranges from 10% by weight to 30% by weight;

Component B ranges from 25% by weight to 45% by weight; and

Component C ranges from 35% by weight to 55% by weight.

3. The mixture according to claim 1, wherein in component T2),

Component A ranges from 15% by weight to 25% by weight;

Component B ranges from 30% by weight to 40% by weight; and

Component C ranges from 40% by weight to 50% by weight.

4. The mixture according to claim 1, wherein in component T2), component A) is a propylene homopolymer.

5. The mixture according to claim 1, wherein in component T2), component B) contains from 5.0% to 15.0% by weight of alpha-olefin derived units.

6. The mixture according to claim 1, wherein in component T2), component C) is a copolymer of ethylene and propylene containing from 37% to 65% by weight of ethylene units.

7. The mixture according to claim 1, wherein in component T2), component A) has a melt flow rate (230° C./2.16 kg) ranging between 50 and 200 g/10 min.

8. The mixture according to claim 1, wherein in component T2), components (A)+(B) blended together have a melt flow rate (230° C./2.16 kg) ranging between 8 and 70 g/10 min.

9. The mixture according to claim 1, wherein component T2) has a melt flow rate (230° C./2.16 kg) between 0.5 to 25 g/10 min.

10. The mixture according to claim 1, wherein component T2) has an intrinsic viscosity [η] (measured in tetrahydronaphthalene at 135° C.) of the xylene soluble fraction at 25° C. between 1.5 to 4.0 dl/g.

11. The mixture according to claim 1, wherein component T2) has an intrinsic viscosity [η] (measured in tetrahydronaphthalene at 135° C.) of the xylene soluble fraction at 25° C. between 2.0 to 3.5 dl/g.

12. The mixture according to claim 1, wherein T1 ranges from 98 wt % to 80 wt % and T2 ranges from 2 wt % to 20 wt %.

13. The mixture according to claim 1, wherein T1 ranges from 97 wt % to 90 wt % and T2 ranges from 3 wt % to 10 wt %.

14. The mixture according to claim 1, wherein T1 ranges from 97 wt % to 92 wt % and T2 ranges from 3 wt % to 8 wt %.

15. The mixture according to claim 1, wherein in component T2), component B) contains from 7.0% to 12.0% by weight of alpha-olefin derived units.

* * * * *